United States Patent
Yu et al.

(10) Patent No.: US 11,372,942 B2
(45) Date of Patent: Jun. 28, 2022

(54) METHOD, APPARATUS, COMPUTER DEVICE AND STORAGE MEDIUM FOR VERIFYING COMMUNITY QUESTION ANSWER DATA

(71) Applicant: BEIJING BAIDU NETCOM SCIENCE AND TECHNOLOGY CO., LTD., Beijing (CN)

(72) Inventors: Miao Yu, Beijing (CN); Xinwei Feng, Beijing (CN); Huanyu Zhou, Beijing (CN); Xunchao Song, Beijing (CN); Songtai Dai, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 148 days.

(21) Appl. No.: 16/691,017

(22) Filed: Nov. 21, 2019

(65) Prior Publication Data

US 2020/0250248 A1    Aug. 6, 2020

(30) Foreign Application Priority Data

Feb. 2, 2019   (CN) .......................... 201910107611.9

(51) Int. Cl.
*G06F 16/9536* (2019.01)
*G06F 16/9032* (2019.01)
(Continued)

(52) U.S. Cl.
CPC .... *G06F 16/9536* (2019.01); *G06F 16/90332* (2019.01); *G06F 16/90344* (2019.01); *G06F 40/295* (2020.01)

(58) Field of Classification Search
CPC ........... G06F 16/9536; G06F 16/90332; G06F 16/90344; G06F 40/295; G06F 16/951
See application file for complete search history.

(56) References Cited

U.S. PATENT DOCUMENTS

2005/0234953 A1    10/2005  Zhang
2006/0106788 A1    5/2006   Forrest
(Continued)

FOREIGN PATENT DOCUMENTS

CN    103577556 A    2/2014
CN    108932349 A    12/2018
(Continued)

OTHER PUBLICATIONS

Cong et al., "Finding Question-Answer Pairs from Online Forums", pp. 467-474 (Year: 2008).*

(Continued)

*Primary Examiner* — Mark D Featherstone
*Assistant Examiner* — Kweku William Halm
(74) *Attorney, Agent, or Firm* — Knobbe, Martens, Olson & Bear LLP (57) ABSTRACT

Embodiments of the present disclosure provide a method, apparatus, computer device, and storage medium for verifying community question answer data. The method may include: acquiring a community question answer data set, and generating a plurality of question answer pairs based on the community question answer data set, a question answer pair including: a question, and a to-be-verified answer corresponding to the question; generating an authoritative data set based on data stored in at least one confidence source site; and performing an authority verification on the to-be-verified answer, based on a score of a similarity between the to-be-verified answer and authoritative data in the authoritative data set in at least one dimension.

12 Claims, 4 Drawing Sheets

(51) Int. Cl.
*G06F 16/903* (2019.01)
*G06F 40/295* (2020.01)

(56) References Cited

U.S. PATENT DOCUMENTS

| | | | |
|---|---|---|---|
| 2010/0191681 A1 | 7/2010 | Pecht | |
| 2010/0191686 A1* | 7/2010 | Wang | G06F 16/33 706/46 |
| 2017/0186070 A1* | 6/2017 | Dong | G06T 11/60 |
| 2018/0025008 A1 | 1/2018 | Tan et al. | |
| 2018/0144234 A1* | 5/2018 | Devesa | G06N 7/00 |

FOREIGN PATENT DOCUMENTS

| | | | |
|---|---|---|---|
| CN | 109101551 A | 12/2018 | |
| JP | 2006127508 | 5/2006 | |
| JP | 2017097561 | 6/2017 | |
| JP | 2017182457 | 10/2017 | |
| KR | 10-2017-0050617 | 5/2017 | |
| WO | WO-2016112679 A1 * | 7/2016 | G06F 16/24578 |
| WO | WO2016/178337 | 11/2016 | |

OTHER PUBLICATIONS

Wang et al, "Ranking community answers by modeling question-answer relationships via analogical reasoning", SIGIR '09: Proceedings of the 32nd international ACM SIGIR conference on Research and development in information retrieval Jul. 2009, pp. 179-186 https://doi.org/10.1145/1571941.1571974 (Year: 2009).*
Kim, et al, Development Status and Upgrade Plan of Korean Analysis and Question Answering Technology in Exobrain Software, Korea Information Science Society, 35(8):51-56 (2017).
Nie et al., Data-Driven Answer Selection in Community QA Systems, IEEE Transactions on Knowledge and Data Engineering, vol. 29 No. 6, Jun. 2017, pp. 1186-1198.

* cited by examiner

METHOD, APPARATUS, COMPUTER DEVICE AND STORAGE MEDIUM FOR VERIFYING COMMUNITY QUESTION ANSWER DATA

CROSS-REFERENCE TO RELATED APPLICATIONS

This application claims priority to Chinese Patent Application No. 201910107611.9, filed with the China National Intellectual Property Administration (CNIPA) on Feb. 2, 2019, the content of which is incorporated herein by reference in its entirety.

TECHNICAL FIELD

Embodiments of the present disclosure relate to data processing technologies, and specifically to a method, apparatus, computer device, and storage medium for verifying community question answer data.

BACKGROUND

With the development of science and technology and the continuous advancement of Internet technology, search-based interactive community question answer platform has become an important channel for one to acquire and share knowledge in life and work. Community question answer (CQA) is a sharing website combining open knowledges (for example: Baidu Knows, Yahoo! Answers, SOSO, Sina ishare, etc.), through user participation and using collective wisdom of network users, it provides direct answers to certain questions. At the same time, the answers to these certain questions may be provided as search results to other users who have the same or similar questions, and accordingly the effect of knowledge sharing has been achieved, and to some extent the demand of users for accurate query has been solved.

However, in CQA data, the quality of the answers varies greatly, and various irrelevant, low-quality, and even malicious information may be included while providing useful answers. Discriminating and filtering such answers helps selecting high-quality pairs of questions and answers helps to reuse the answers to relevant questions in a community-based automated question answer system, to improve the service quality of the Q&A system.

At present, high-quality, high-accuracy CQA data screening is mainly performed through manual review, multi-dimensional explicit feature screening and semantic retrieval model filtering. With the exponential upgrade of Internet data, manual review is especially inadequate. Multi-dimensional explicit feature screening is currently dependent on user behavior (such as likes or dislikes). Although the information may have certain directional help in determining whether an answer is meaningful, a user's like and dislike behavior is affected by certain subjective emotions, and low-quality or even malicious answers are likely to appear. In addition, the information is not comprehensive enough, and there is not enough user information for less exposed Q&A data.

Currently, a semantic retrieval model usually calculates the relevance of questions and answers in CQA at the semantic aspect, but there is no guarantee whether the answers are objective and authoritative. For example: for a question "Who is user A's wife?", a user replies: "User A's wife is not user B", however, in fact, user A's wife is user B. If there is no support from external assistance information, the semantic retrieval model may mistakenly believe that the answer is correct.

SUMMARY

Embodiments of the present disclosure provide a method, apparatus, computer device, and storage medium for verifying community question answer data, which may quickly verify the authorities of a large number of question answer data, and effectively guarantee the authority, objectivity and accuracy of the answers.

In a first aspect, some embodiments of the present disclosure provide a method for verifying community question answer data, including:

acquiring a community question answer data set, and generating a plurality of question answer pairs based on the community question answer data set, a question answer pair including: a question, and a to-be-verified answer corresponding to the question;

generating an authoritative data set based on data stored in at least one confidence source site; and performing an authority verification on the to-be-verified answer, based on a score of a similarity between the to-be-verified answer and authoritative data in the authoritative data set in at least one dimension.

In a second aspect, some embodiments of the present disclosure further provide an apparatus for verifying community question answer data, including:

a question answer pair generation module, configured to acquire a community question answer data set, and generate a plurality of question answer pairs based on the community question answer data set, a question answer pair including: a question, and a to-be-verified answer corresponding to the question;

an authoritative data set generation module, configured to generate an authoritative data set based on data stored in at least one confidence source site; and an authority verification module, configured to perform an authority verification on the to-be-verified answer, based on a score of a similarity between the to-be-verified answer and authoritative data in the authoritative data set in at least one dimension.

In a third aspect, some embodiments of the present disclosure further provide a computer device, including a storage apparatus, a processors, and a computer program stored on the storage apparatus and executable by the processor, the computer program, when executed by the processor, implements a method for verifying community question answer data according to any one of the embodiments of the present disclosure.

In a fourth aspect, some embodiments of the present disclosure further provide a computer readable storage medium, storing a computer program thereon, the program, when executed by a processor, implements a method for verifying community question answer data according to any one of the embodiments of the present disclosure.

Embodiments of the present disclosure generate a question answer pair by screening data from a community question answer data set, at the same time obtain an authoritative data set from a confidence source site, calculate a score of a similarity between a to-be-verified answer in each question answer pair and authoritative data in the authoritative data set, and determine the authority of the to-be-verified answer in each question answer pair based on the scores of the similarity. By cleverly using the method of verifying the similarity between the answer provided by a user and the authoritative data, the technical approach verifies the authority of the answer simply and rapidly, and solves the problem that community question answer data screened manually is inefficient in the existing technology while relying on user behavior to evaluate an answer which leads to a highly subjective evaluation result. The technical approach may quickly verify the authority of a large number of community question answer data, improve the verification efficiency, and determine the authority of the to-be-verified answer by calculating a score of the similarity between the to-be-verified answer and the authoritative data, and thus the use of user display feature screening may be avoided, and the authority, objectivity and accuracy of the answers in the question answer data are effectively guaranteed.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the scope the disclosure. In addition, it should be noted that, for the ease of description, only the parts related to the present disclosure, not all of the structures, are shown in the accompanying drawings.

Embodiment 1

Figure 1:
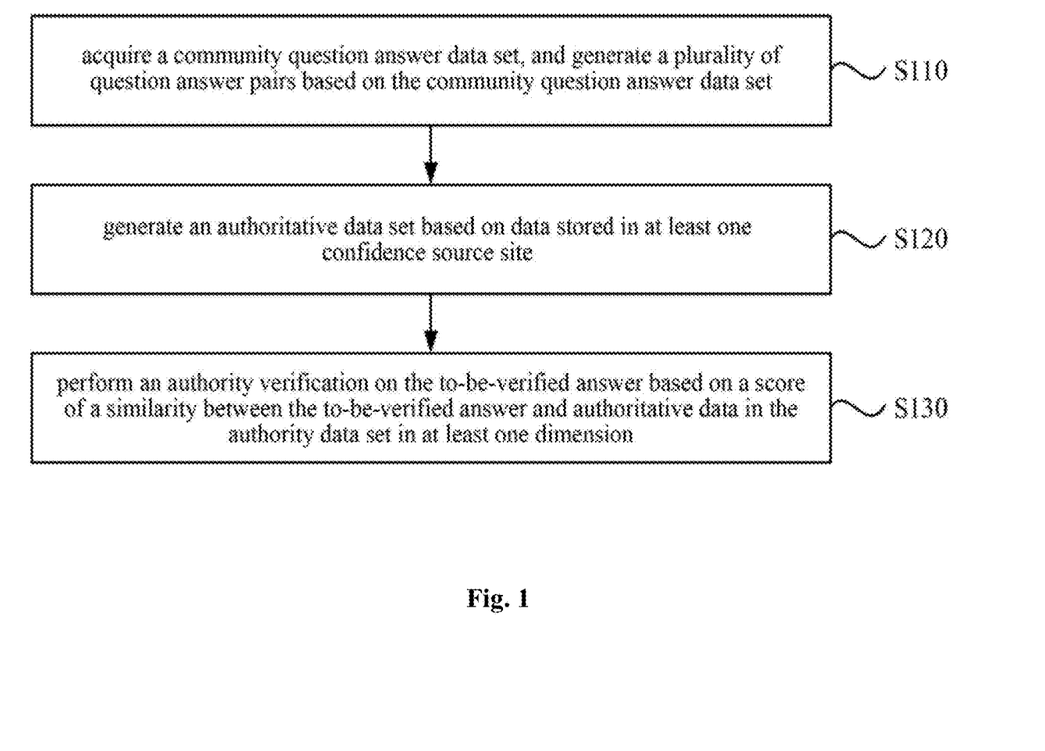
FIG. 1 is a flowchart of a method for verifying community question answer data according to Embodiment 1 of the present disclosure.

FIG. 1 is a flowchart of a method for verifying community question answer data according to Embodiment 1 of the present disclosure. The present embodiment may be applied to verify the authority of an answer in question answer data of a community question answer platform. The method may be executed by an apparatus for verifying community question answer data provided by some embodiments of the present disclosure. The apparatus may be implemented by software and/or hardware, and may be generally integrated in the computer device for providing a service of verifying community question answer data, such as a client or server. As shown in FIG. 1, the method of the present embodiment specifically includes:

S110, acquiring a community question answer data set, and generating a plurality of question answer pairs based on the community question answer data set, a question answer pair including: a question, and a to-be-verified answer corresponding to the question.

Specifically, the community question answer data set may refer to a collection of question answer data collected from various community question answer platforms in the network. The question answer pair may refer to a combination of a question and a to-be-verified answer of the question. There are a plurality of to-be-verified answers for one question in the community question answer data set, and a question answer pair may be generated for each of the to-be-verified answers respectively.

For an example, the community question answer platform may refer to an open community question answer platform such as Baidu Knows, Sina ishare, or SOSO. The question answer data in a community question answer platform may be Chinese, or other foreign texts, such as English.

S120, generating an authoritative data set based on data stored in at least one confidence source site.

Specifically, the confidence source site may refer to a website of preset authoritative data, for example, authoritative data sources such as Baidu Encyclopedia, Wikipedia, Douding.com or Baidu Wenku. The confidence source site may be selected by a user.

The authoritative data set may refer to valid data stored in a confidence source site, such as data having entity semantics. For an example, in the sentence "Haha, A is a subset of B", the first part of the sentence is a modal particle, and the second part of the sentence is data having entity semantics. The modal particle may be removed, and an authoritative data set is generated only based on the second part of the sentence.

Alternatively, the generating an authoritative data set based on data stored in at least one confidence source site may include: selecting at least one confidence source site, acquiring site data of each confidence source site for data cleaning, and structured analysis, to generate the authoritative data set.

The data cleaning may refer to at least one of the data operations such as deduplication, removing invalidation, removing errors, and removing collisions performed on the site data. The structured analysis may refer to analyzing the data structure in the site data, for example, acquiring entities included in a sentence in the site data, and the grammatical structure of the sentence. Data cleaning and structured analysis are performed on the site data, and based on the analysis result, the site data may be configured into a unified format (such as represented by a two-dimensional logic table), and the set formed by the configured data is used as the authoritative data set. Generating the authoritative data set by data pre-processing the site data of the confidence source site, the authoritative data may be quickly structured, which facilitates quick viewing and understanding and accurate semantic retrieval, thereby improving the efficiency of subsequent calculation of the score of the similarity between the to-be-verified answer and the authoritative data.

S130, performing an authority verification on the to-be-verified answer, based on a score of a similarity between the to-be-verified answer and authoritative data in the authoritative data set in at least one dimension.

Specifically, the score of the similarity may refer to an evaluation result of the similarity between the to-be-verified answer and the authoritative data. The dimension may refer to a feature type at which the similarity is evaluated, and may specifically include at least one of a keyword feature, a syntax feature, or a semantic feature.

Typically, when a user answers a question, the objectivity and accuracy of an answer "quoting from the classics" is much higher than other user answers. In the present embodiment, the authority verification may refer to judging whether the to-be-verified answer is included in the data stored in a confidence source site (e.g., an authoritative website). Specifically, when the original text of the to-be-verified answer is included in the authoritative data set, the authority of the to-be-verified answer may be considered to be high; when the data similar to the to-be-verified answer is included in the authoritative data set, the authority of the to-be-verified answer may be considered to be medium; and when all the data in the authoritative data set are in low similarity with the to-be-verified answer, the authority of the to-be-verified answer may be considered to be low.

Correspondingly, the to-be-verified answers with low authority obtained from the above similarity scores may be marked, reminded or screened out, to ensure the accuracy and authority of the user answers in the community question answer data.

Some embodiments of the present disclosure generate question answer pairs by screening data from a community question answer data set, at the same time obtain an authoritative data set from a confidence source site, calculate a score of the similarity between a to-be-verified answer in each question answer pair and authoritative data in the authoritative data set, and determine the authority of the to-be-verified answer in each question answer pair based on the scores of the similarity. By cleverly using the method of verifying the similarity between the answer provided by a user and the authoritative data, the technical approach verifies the authority of the answer simply and rapidly, and solves the problem that community question answer data screened manually is inefficient in the existing technology while relying on user behavior to evaluate an answer which leads to a highly subjective evaluation result. The technical approach may quickly verify the authority of a large number of community question answer data, improve the verification efficiency, and determine the authority of the to-be-verified answer by calculating a score of the similarity between the to-be-verified answer and the authoritative data, and thus the use of user display feature screening may be avoided, and the authority, objectivity and accuracy of the answers in the question answer data are effectively guaranteed.

Embodiment 2

Figure 2A:
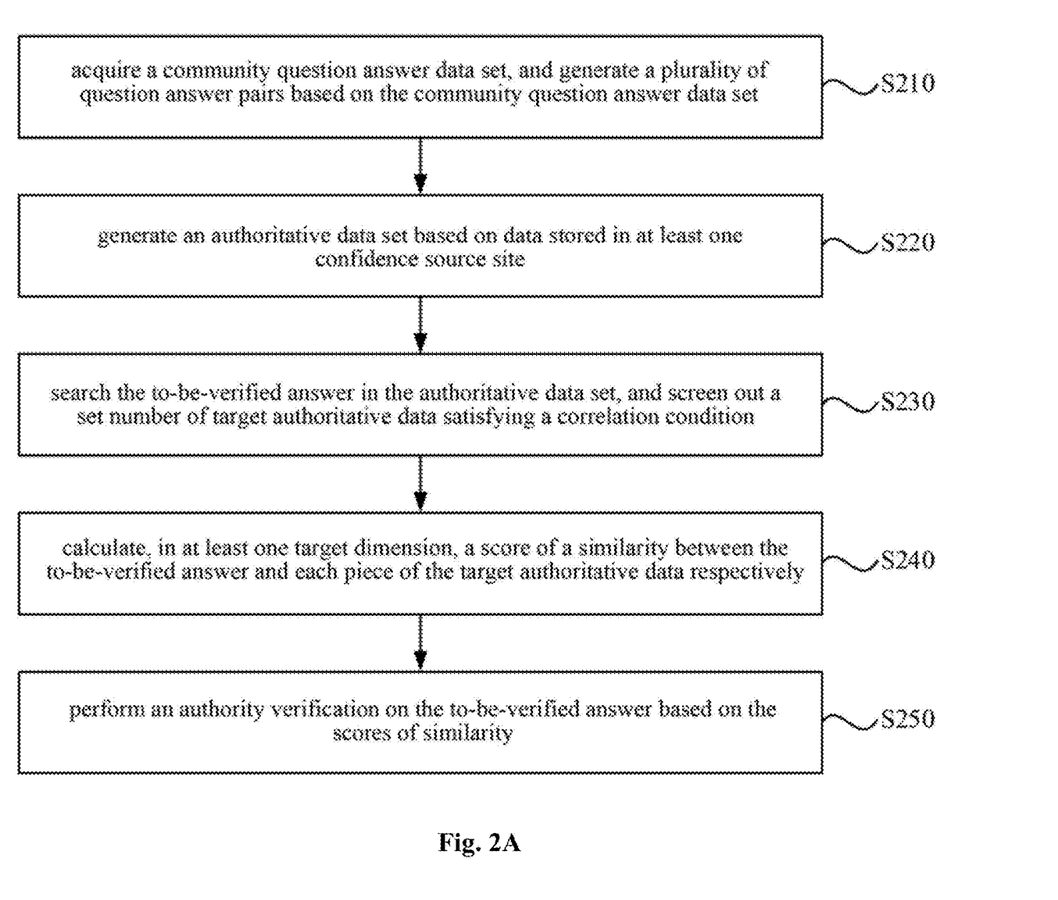
FIG. 2A is a flowchart of the method for verifying community question answer data according to Embodiment 2 of the present disclosure.

FIG. 2A is a flowchart of the method for verifying community question answer data according to Embodiment 2 of the present disclosure. The present embodiment further embodied the method based on Embodiment 1 of the present disclosure, and the step: the performing an authority verification on the to-be-verified answer, based on a score of a similarity between the to-be-verified answers and authoritative data in the authoritative data set in at least one dimension, is embodied as: searching the to-be-verified answer in the authoritative data set, and screening out a set number of target authoritative data satisfying a correlation condition; calculating, in at least one target dimension, a score of a similarity between the to-be-verified answer and each piece of the target authoritative data respectively; and performing the authority verification on the to-be-verified answer based on the similarity scores.

As shown in FIG. 2A, the method specifically includes:

S210, acquiring a community question answer data set, and generating a plurality of question answer pairs based on the community question answer data set, a question answer pair including: a question, and a to-be-verified answer corresponding to the question.

The community question answer data set, the question answer pair, the confidence source site, the authoritative data set, the score of a similarity, the authority verification, or the like in the present embodiment may be referred to the description of the above embodiment.

S220, generating an authoritative data set based on data stored in at least one confidence source site.

S230, searching the to-be-verified answer in the authoritative data set, and screening out a set number of target authoritative data satisfying a correlation condition.

The target authoritative data satisfying the correlation condition may refer to the authoritative data having a degree of correlation with the to-be-verified answer exceeding a set threshold. The set number may be an integer greater than or equal to 1, and may be set by the user as needed. As an example, the set number is 10.

Alternatively, a keyword in the to-be-verified answer may be acquired, and a search is performed in the authoritative data set based on the keyword in the to-be-verified answer, and the authoritative data in the authoritative data set is sorted according to the correlation between the keyword and the authoritative data. The first N pieces of authoritative data in the sorting result are took as the target authoritative data satisfying the correlation condition. N is a positive integer, which may be specifically set as needed.

Word extraction, word segmentation, noise cancellation, de-duplication and keyword extraction may be performed on the to-be-verified answer to obtain the keyword in the to-be-verified answer, where the keyword may be extracted from the to-be-verified answer by a pre-trained machine learning model. For example, the machine learning model may be trained by a supervised learning method, a sequence labeling method, or an unsupervised learning method.

A search is performed in the authoritative data set based on the at least one keyword extracted from the to-be-verified answer, and information such as the number of times, frequency, location, or format of the at least one keyword occurring in each authoritative data is obtained. Furthermore, the correlation between the to-be-verified answer and the authoritative data is calculated based on the common degree of each keyword itself (such as the common degree of "we" is higher than the common degree of "constellation"), the number of times, frequency, location, and format of each keyword occurring in the authoritative data, the weight of each keyword and the distance between the keywords. Thus, the degree of correlation between the authoritative data in the authoritative data set and the to-be-verified answer may be calculated, thereby determining N pieces of target authoritative data satisfying the correlation condition, and screening.

S240, calculating, in at least one target dimension, a score of a similarity between the to-be-verified answer and each piece of the target authoritative data respectively.

Specifically, the target dimension may include: a keyword dimension, a sentence dimension, and a semantic dimension. The keyword dimension may refer to similarity comparison between the keywords extracted from the to-be-verified answer and keywords extracted from the respective target authoritative data; the sentence dimension may refer to a similarity comparison between a sentence included in the to-be-verified answer and sentences included in the respective target authoritative data; and the semantic dimension may refer to a similarity comparison between the semantics of the to-be-verified answer and the semantics of respective target authoritative data.

The calculation of the score of similarity in every target dimension all may be achieved through the pre-trained machine learning model. Or, the score of similarity may also be calculated by other methods.

In the actual application of the computing, the authority verification on each of the to-be-verified answers may be performed based on the score of the similarity between the to-be-verified answer and each piece of the target authoritative data in one, two or all three dimensions.

Alternatively, calculating, in the keyword dimension, the score of the similarity between the to-be-verified answer and each piece of the target authoritative data, includes: acquiring a first keyword set included in the to-be-verified answer and a second keyword set included in each piece of the target authoritative data respectively; acquiring a number of keywords in the first keyword set hitting the second keyword sets; and calculating, in the keyword dimension, the score of the similarity between the to-be-verified answer and each piece of the target authoritative data based on the number of the keywords and a total number of keywords included in the second keyword sets.

Specifically, both the first keyword set and the second keyword set may be generated by a pre-trained machine learning model for keyword extraction. The number of keywords in the first keyword set hitting the second keyword set may refer to the number of the keywords identical in the first keyword set and the second keyword set. A first score of similarity may specifically refer to a ratio of the number of the keywords to the total number of keywords. As an example, the number of keywords in the first keyword set hitting the second keyword set is six, and the total number of keywords included in the second keyword set is ten, according to the first keyword set and the second keyword set, in the keyword dimension, the calculated score of the similarity between to-be-verified answer and the corresponding target authoritative data is 6/10=60%.

Alternatively, calculating, in the sentence dimension, the score of the similarity between the to-be-verified answer and each piece of the target authoritative data, may include: verifying whether the to-be-verified answer hits a sentence included in each piece of the target authoritative data respectively; and calculating, based on a hit result, the score of the similarity between the to-be-verified answer and each piece of the target authoritative data in the sentence dimension.

Specifically, whether the to-be-verified answer hits the sentence included in the target authoritative data may refer to whether one or more sentences included in the to-be-verified answer belong to the set of sentences included in the target authoritative data. The hit result includes 0 and 1, the score of similarity corresponding to the hit result 0 is 0, and the score of similarity corresponding to the hit result 1 is 1.

When one or more sentences in the to-be-verified answer are included in the target authoritative data, the hit result is 1; when the target authoritative data does not include any sentence included in the to-be-verified answer, the hit result is 0. As an example, the to-be-verified answer is one sentence, and at the same time, a sentence same as the to-be-verified answer is included in the sentences included in the target authoritative data, then the hit result is 1, and the calculated score of the similarity between the to-be-verified answer and the corresponding target authoritative data is also 1 in the sentence dimension.

Alternatively, calculating, in the semantic dimension, the score of the similarity between the to-be-verified answer and each piece of the target authoritative data, includes: combining the to-be-verified answer and each piece of the target authoritative data into input data respectively; inputting each piece of the input data into a pre-trained semantic similarity recognition model; and acquiring an output result by the semantic similarity recognition model for the each piece of the input data as the score of the similarity between the to-be-verified answer and each piece of the target authoritative data in the semantic dimension.

Specifically, the pre-trained semantic similarity recognition model may refer to a model trained by a machine learning model through samples. Specifically, the semantic similarity recognition model may be deep structured semantic models (DSSM), or may be deep structured semantic models of convolutional neural networks (CNN), or may be deep structured semantic models of long-short term memory (LSTM), which is not specifically limited in the embodiments of the present disclosure. Combining the to-be-verified answer and each piece of the target authoritative data to form a plurality of input data, and inputting each piece of the input data into the pre-trained semantic similarity recognition model, to obtain the score of similarity output by the semantic similarity recognition model, as the score of the similarity between the to-be-verified answer and each piece of the target authoritative data in the semantic dimension.

By calculating the scores of the similarity between a to-be-verified answer and the target authoritative data at the keyword dimension, the sentence dimension and the semantic dimension respectively, the similarity degree between the to-be-verified answer and the authoritative data may be evaluated at a plurality of aspects, thereby whether the to-be-verified answer is authoritative is accurately evaluated. In addition, at a target dimension, the similarity is calculated based on the feature information of the to-be-verified answer, user behaviors are not involved, and thus the situation of evaluating the authoritativeness of the to-be-verified answer being affected by the user's subjective thoughts is avoided, thereby the objectivity of the evaluation result of the to-be-verified answer is guaranteed.

S250, performing the authority verification on the to-be-verified answer based on the similarity scores.

Alternatively, the performing the authority verification on the to-be-verified answer based on the similarity scores, may include:

calculating an authority score of the to-be-verified answer according to the formula:

$$\frac{\sum_{i=0}^{N} \alpha * \text{Word}(Ans, P_i) + \beta * \text{Sent}(Ans, P_i) + \gamma * \text{Sim}(Ans, P_i)}{N};$$

where N is the number of target authoritative data satisfying the correlation condition screened out from the authoritative data set; $\text{Word}(Ans, P_i)$ is a score of a similarity between the to-be-verified answer Ans and the $i^{th}$ target authoritative data $P_i$ in the keyword dimension, $\text{Sent}(Ans, P_i)$ is a score of a similarity between Ans and $P_i$ in the sentence dimension, $\text{Sim}(Ans, P_i)$ is a score of a similarity between Ans and $P_i$ in the semantic dimension, and $\alpha$, $\beta$ and $\gamma$ are preset ratio factors; and in response to the authority score being less than a set authority threshold, filtering and removing the to-be-verified answer from the community question answer data set.

$\text{Word}(Ans, P_i)$ is used to indicate the degree of the to-be-verified answer coinciding with the $i^{th}$ target authoritative data in the keyword dimension; $\text{Sent}(Ans, P_i)$ is used to indicate the degree of the to-be-verified answer coinciding with the $i^{th}$ target authoritative data in the sentence dimension; $\text{Sim}(Ans, P_i)$ is used to indicate the degree of the to-be-verified answer coinciding with the $i^{th}$ target authoritative data in the semantic dimension; and $\alpha$, $\beta$ and $\gamma$ are preset ratio factors that may be set by the user as needed, and α, β and γ are respectively used to indicate the weight value of the first similarity score, the weight value of the second similarity score and the weight value of the third similarity score. The authority threshold may be set by the user as needed. In addition, the size of the authority threshold may be controlled subsequently to effectively screen the authoritative to-be-verified answer.

The specific formula and the functions are used to quantify the degree of similarity between the to-be-verified answer and the $i^{th}$ target authoritative data, so as to accurately calculate the score of similarity between the to-be-verified answer and the $i^{th}$ target authoritative data, and calculate the mean value of the weighted sum of the scores of similarity at the same time, comprehensively considering each piece of the target authoritative data is realized, thereby accurately evaluating the authority of the to-be-verified answer.

It should be noted that, based on the scores of similarity in any one or any two dimensions described above, the mean value of the weighted sum of the scores of similarity may be calculated as the authority score of the to-be-verified answer, thereby performing authority verification on the to-be-verified answers.

Figure 2B:
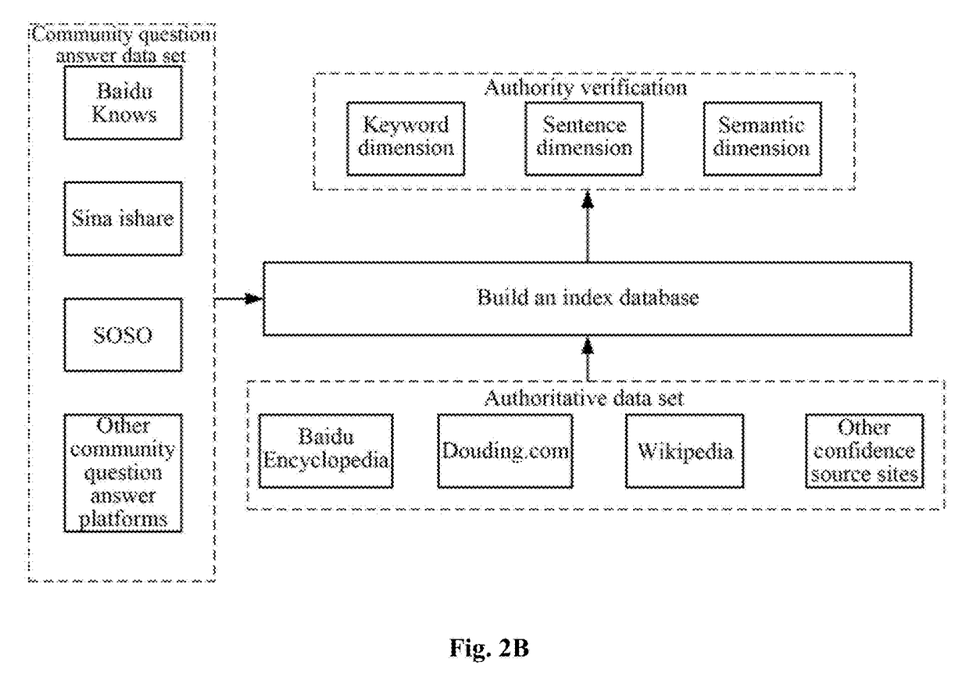
FIG. 2B is a schematic diagram of a specific application scenario of the method for verifying community question answer data according to Embodiment 2 of the present disclosure.

In a specific example, as shown in FIG. 2B, question answer data are collected from Baidu Knows, Sina ishare, SOSO and other community question answer platforms to generate a community question answer data set, and at the same time authoritative data are collected from Baidu Encyclopedia, Douding.com, Wikipedia, and other confidence source sites to generate an authoritative data set. An index database is built in the authoritative data set, a search is performed based on the question answer pairs extracted from the community question answer data set, to acquire N pieces of target authoritative data corresponding to the to-be-verified answer in each question answer pair. The feature information of each to-be-verified answer and feature information of the matched N pieces of target authoritative data are acquired respectively, and the scores of the similarity between the feature information of the to-be-verified answer and each piece of the target authoritative data are calculated in the keyword dimension, the sentence dimension, and the semantic dimension respectively. Finally, authority verification is performed on the to-be-verified answer based on the scores of the similarity between the feature information of the to-be-verified answer and each piece of the target authoritative data.

Embodiments of the present disclosure screen at least one piece of target authoritative data by searching in the authoritative data set based on the to-be-verified answer, and for each piece of the target authoritative data, calculate the score of the similarity between the to-be-verified answer and the piece of target authoritative data, and perform authority verification on the to-be-verified answer based on the obtained at least one scores of similarity. The degree of similarity between the to-be-verified answer and the authoritative data may be evaluated at a plurality of dimensions, implementing accurately evaluating whether the to-be-verified answer is authoritative.

Embodiment 3

Figure 3:
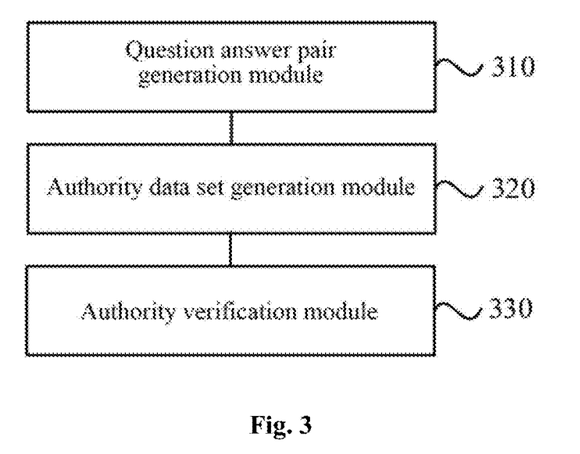
FIG. 3 is a schematic structural diagram of an apparatus for verifying community question answer data according to Embodiment 3 of the present disclosure.

FIG. 3 is a schematic structural diagram of an apparatus for verifying community question answer data according to Embodiment 3 of the present disclosure. As shown in FIG. 3, the apparatus specifically includes:

a question answer pair generation module 310, configured to acquire a community question answer data set, and generate a plurality of question answer pairs based on the community question answer data set, a question answer pair including: a question, and a to-be-verified answer corresponding to the question;

an authoritative data set generation module 320, configured to generate an authoritative data set based on data stored in at least one confidence source site; and an authority verification module 330, configured to perform an authority verification on the to-be-verified answer, based on a score of a similarity between the to-be-verified answer and authoritative data in the authoritative data set in at least one dimension.

Embodiments of the present disclosure generate question answer pairs by screening data from a community question answer data set, at the same time obtain an authoritative data set from a confidence source site, calculate a score of a similarity between a to-be-verified answer in each question answer pair and authoritative data in the authoritative data set, and determine the authority of the to-be-verified answer in each question answer pair based on the scores of similarity. By cleverly using the method of verifying the similarity between the answer provided by a user and the authoritative data, the technical approach verifies the authority of the answer simply and rapidly, and solves the problem that community question answer data screened manually is inefficient in the existing technology while relying on user behavior to evaluate an answer which leads to a highly subjective evaluation result. The technical approach may quickly verify the authority of a large number of community question answer data, improve the verification efficiency, and determine the authority of the to-be-verified answer by calculating a score of the similarity between the to-be-verified answer and the authoritative data, and thus the use of user display feature screening may be avoided, and the authority, objectivity and accuracy of the answers in the question answer data are effectively guaranteed.

Further, the authority verification module 330 is specifically configured to: search the to-be-verified answer in the authoritative data set, and screen out a set number of target authoritative data satisfying a correlation condition; calculate, in at least one target dimension, a score of a similarity between the to-be-verified answer and each piece of the target authoritative data respectively; and perform the authority verification on the to-be-verified answer based on the similarity scores.

Further, the target dimension includes: a keyword dimension, a sentence dimension or a semantic dimension.

Further, the authority verification module 330 is specifically configured to: acquire a first keyword set included in the to-be-verified answer and a second keyword set included in the each piece of the target authoritative data respectively; acquire a number of keywords in the first keyword set hitting the second keyword sets; and calculate, in the keyword dimension, the score of the similarity between the to-be-verified answer and the each piece of the target authoritative data based on the number of the keywords and a total number of keywords included in the second keyword sets.

Further, the authority verification module 330 is specifically configured to: verify whether the to-be-verified answer hits a sentence included in the each piece of the target authoritative data respectively; and calculate, based on a hit result, the score of the similarity between the to-be-verified answer and the each piece of the target authoritative data in the sentence dimension.

Further, the authority verification module 330 is specifically configured to: combine the to-be-verified answer and the each piece of the target authoritative data into input data respectively; input each piece of the input data into a pre-trained semantic similarity recognition model; and acquire an output result by the semantic similarity recognition model for the each piece of the input data as the score of the similarity between the to-be-verified answer and the each piece of the target authoritative data in the semantic dimension.

Further, the authority verification module 330 is specifically configured to: calculate an authority score of the to-be-verified answer according to a formula:

$$\frac{\sum_{i=0}^{N} \alpha * \text{Word}(Ans, P_i) + \beta * \text{Sent}(Ans, P_i) + \gamma * \text{Sim}(Ans, P_i)}{N};$$

where N is the number of target authoritative data satisfying the correlation condition and screened out from the authoritative data set; Word(Ans,$P_i$) is a score of a similarity between the to-be-verified answer Ans and an $i^{th}$ target authoritative data $P_i$ in the keyword dimension, Sent(Ans,$P_i$) is a score of a similarity between Ans and $P_i$ in the sentence dimension, Sim(Ans,$P_i$) is a score of a similarity between Ans and $P_i$ in the semantic dimension, and α, β and γ are preset ratio factors; and in response to the authority score being less than a set authority threshold, filter and remove the to-be-verified answer from the community question answer data set.

Further, the authoritative data set generation module 320 is specifically configured to: select at least one confidence source site, acquire site data of each confidence source site for data cleaning and structured analysis, to generate the authoritative data set.

The apparatus for verifying community question answer data may perform the method for verifying community question answer data provided by any embodiment of the present disclosure, and has the corresponding functional modules and beneficial effects for executing the method for verifying community question answer data.

Embodiment 4

Figure 4:
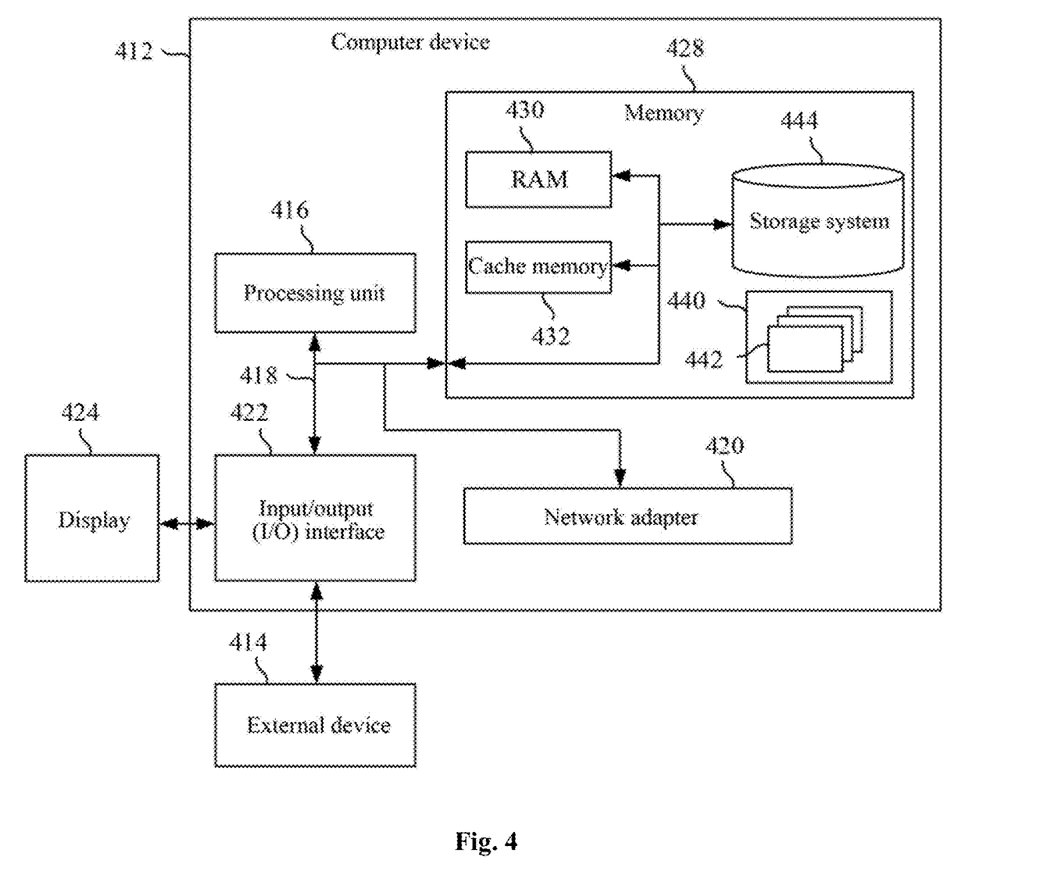
FIG. 4 is a schematic structural diagram of a computer device according to Embodiment 4 of the present disclosure.

FIG. 4 is a schematic structural diagram of a computer device according to Embodiment 4 of the present disclosure. FIG. 4 illustrates a block diagram of an example computer device 412 suitable for implementing some embodiments of the present disclosure. The computer device 412 shown in FIG. 4 is merely an example and should not impose any limitation on the function and scope of use of the embodiments of the present disclosure.

As shown in FIG. 4, the computer device 412 is embodied in the form of a general purpose computing device. Components of the computer device 412 may include, but are not limited to, one or more processors or processing units 416, a system memory 428, and a bus 418 that connects different system components (including the system memory 428 and the processing unit 416). The computer device 412 may be a vehicle-mounted device.

The bus 418 indicates one or more of the several types of bus structures, including a memory bus or memory controller, a peripheral bus, a graphics acceleration port, a processor, or a local bus adopting a bus structure of any of a variety of bus structures. For example, these architectures include, but are not limited to, the Industry Standard Architecture (ISA) bus, the Micro Channel Architecture (MCA) bus, the Enhanced ISA bus, the Video Electronics Standards Association (VESA) local Bus and the Peripheral Component Interconnect (PCI) bus.

The computer device 412 typically includes a variety of computer system readable mediums. These mediums may be any available medium that can be accessed by the computer device 412, including volatile and non-volatile medium, removable and non-removable medium.

The system memory 428 may include computer system readable medium in the form of volatile memory, such as a random access memory (RAM) 430 and/or a cache memory 432. The computer device 412 may further include other removable/non-removable, volatile/non-volatile computer system storage medium. As an example only, a storage system 444 may be used to read and write non-removable, non-volatile magnetic medium (not shown in FIG. 4, commonly referred to as a "hard disk drive"). Although not shown in FIG. 4, a disk drive (i.g., a "floppy disk") for reading and writing to a removable non-volatile disk, and an optical disc drive for reading and writing to a removable non-volatile optical disc (i.g., a compact disc read-only memory (CD-ROM), a digital video disc-read only memory (DVD-ROM), or other optical mediums). In these cases, each drive may be connected to the bus 418 via one or more data medium interfaces. The memory 428 may include at least one program product having a set of (e.g., at least one) program modules configured to perform the functions of the various embodiments of the present disclosure.

A program/general utility tool 440 having a set of (at least one) program modules 442 may be stored, for example, in the memory 428. Such program modules 442 include, but are not limited to, an operating system, one or more applications, other programs modules and program data, each of these examples or some combination may include an implementation of a network environment. The program module 442 typically performs the functions and/or methods described by embodiments the present disclosure.

The computer device 412 may also be in communication with one or more external devices 414 (e.g., a keyboard, pointing device, display 424, etc.), and may also be in communication with one or more devices that enable the user to interact with the computer device 412, and/or in communication with any device (e.g., a network card, modem, etc.) that enables the computer device 412 to communicate with one or more other computing devices. This communication may take place via an input/output (I/O) interface 422. Moreover, the computer device 412 may also communicate with one or more networks (e.g., a local area network (LAN), a wide area network (WAN)) through a network adapter 420. As shown in the figure, the network adapter 420 communicates with other modules of the computer device 412 via the bus 418. It should be understood that although not shown in FIG. 4, other hardware and/or software modules may be used in conjunction with the computer device 412, including but not limited to: microcode, device drivers, redundant processing units, redundant arrays of inexpensive disks (RAID) systems, tape drives, and data backup storage systems.

The processing unit 416 performs various function applications and data processing by executing a program stored in the system memory 428, for example, a method for verifying community question answer data provided by some embodiments of the present disclosure.

That is, when the processing unit executes the program, implementing: acquiring a community question answer data set, and generating a plurality of question answer pairs based on the community question answer data set, the question answer pair including: a question, and a to-be-verified answer corresponding to the question; generating an authoritative data set based on data stored in at least one confidence source site; and performing an authority verification on the to-be-verified answer, based on a score of a similarity between the to-be-verified answer and authoritative data in the authoritative data set in at least one dimension.

Embodiment 5

The Embodiment 5 of the present disclosure further provides a computer readable storage medium, storing a computer program thereon, the program, when executed by a processor, implements a method for verifying community question answer data according to any of the embodiments of the present disclosure: acquiring a community question answer data set, and generating a plurality of question answer pairs based on the community question answer data set, a question answer pair including: a question, and a to-be-verified answer corresponding to the question; generating an authoritative data set based on data stored in at least one confidence source site; and performing an authority verification on the to-be-verified answer, based on a score of a similarity between the to-be-verified answer and authoritative data in the authoritative data set in at least one dimension.

A computer storage medium according to embodiments of the present disclosure may use any combination of one or more computer readable mediums. The computer readable medium may be a computer readable signal medium or a computer readable storage medium. The computer readable storage medium may be, for example, but not limited to, electric, magnetic, optical, electromagnetic, infrared, or semiconductor systems, apparatus, elements, or a combination of any of the above. A more specific example (non-exhaustive list) of the computer readable storage medium may include but is not limited to: electrical connection with one or more wires, a portable computer disk, a hard disk, a RAM, a read only memory (ROM), an erasable programmable read only memory (EPROM), a flash memory, a fiber, a portable CD-ROM, an optical memory, a magnet memory or any suitable combination of the above. The computer readable storage medium herein may be any tangible medium containing or storing programs which may be used by a command execution system, apparatus or element or incorporated thereto.

The computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element.

The program codes contained on the computer readable medium may be transmitted with any suitable medium including but not limited to: wireless, wired, optical cable, radiofrequency (RF) etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including LAN or WAN, or may be connected to an external computer (for example, connected through Internet using an Internet service provider).

It should be noted that the above are non-limiting embodiments of the present disclosure and the technical principles applied. It should be appreciated by those skilled in the art that the present disclosure is not limited to the specific embodiments described herein, and that various modifications, changes and substitutions may be made without departing from the scope of the present disclosure. Although the present disclosure has been described in detail through the above embodiments, the present disclosure is not limited to the above embodiments, other equivalent embodiments may be included without departing from the inventive concept, and the scope of the disclosure is determined by the scope of the appended claims.

What is claimed is:

1. A method for verifying community question answer data, the method comprising:
   acquiring a community question answer data set, and generating a plurality of question answer pairs based on the community question answer data set, a question answer pair comprising: a question, and a to-be-verified answer corresponding to the question;
   generating an authoritative data set based on data stored in at least one confidence source site;
   performing an authority verification on the to-be-verified answer, based on a score of a similarity between the to-be-verified answer and authoritative data in the authoritative data set in at least one dimension;
   searching the to-be-verified answer in the authoritative data set, and screening out a set number of target authoritative data satisfying a correlation condition;
   calculating, in at least one target dimension, a score of a similarity between the to-be-verified answer and each piece of the target authoritative data respectively, the target dimension refers to a keyword dimension, a sentence dimension or a semantic dimension;
   calculating an authority score of the to-be-verified answer according to a formula:

$$\frac{\sum_{i=0}^{N} \alpha * \text{Word}(Ans, P_i) + \beta * \text{Sent}(Ans, P_i) + \gamma * \text{Sim}(Ans, P_i)}{N};$$

wherein N is the number of target authoritative data satisfying the correlation condition and screened out from the authoritative data set; $\text{Word}(Ans, P_i)$ is a score of a similarity between the to-be-verified answer Ans and an $i^{th}$ target authoritative data $P_i$ in the keyword dimension, $\text{Sent}(Ans, P_i)$ is a score of a similarity between Ans and $P_i$ in the sentence dimension, Sim (Ans,$P_i$) is a score of a similarity between Ans and $P_i$ in the semantic dimension, and α, β and γ are preset ratio factors; and in response to the authority score being less than a set authority threshold, filtering and removing the to-be-verified answer from the community question answer data set.

2. The method according to claim 1, wherein calculating, in the keyword dimension, a score of a similarity between the to-be-verified answer and each piece of the target authoritative data, comprises:

acquiring a first keyword set comprised in the to-be-verified answer and a second keyword set comprised in the each piece of the target authoritative data respectively;

acquiring a number of keywords in the first keyword set hitting the second keyword sets; and calculating, in the keyword dimension, the score of the similarity between the to-be-verified answer and the each piece of the target authoritative data based on the number of the keywords and a total number of keywords comprised in the second keyword sets.

3. The method according to claim 1, wherein calculating, in the sentence dimension, a score of a similarity between the to-be-verified answer and each piece of the target authoritative data, comprises:

verifying whether the to-be-verified answer hits a sentence comprised in the each piece of the target authoritative data respectively; and calculating, based on a hit result, the score of the similarity between the to-be-verified answer and the each piece of the target authoritative data in the sentence dimension.

4. The method according to claim 1, wherein calculating, in the semantic dimension, a score of a similarity between the to-be-verified answer and each piece of the target authoritative data, comprises:

combining the to-be-verified answer and the each piece of the target authoritative data into input data respectively;

inputting each piece of the input data into a pre-trained semantic similarity recognition model; and acquiring an output result by the semantic similarity recognition model for the each piece of the input data as the score of the similarity between the to-be-verified answer and the each piece of the target authoritative data in the semantic dimension.

5. The method according to claim 1, wherein the generating an authoritative data set based on data stored in at least one confidence source site, comprises:

selecting at least one confidence source site, acquiring site data of each confidence source site for data cleaning and structured analysis, to generate the authoritative data set.

6. An apparatus for verifying community question answer data, the apparatus comprising:

at least one processor; and a memory storing instructions, the instructions when executed by the at least one processor, cause the at least one processor to perform operations, the operations comprising:

acquiring a community question answer data set, and generating a plurality of question answer pairs based on the community question answer data set, a question answer pair comprising: a question, and a to-be-verified answer corresponding to the question;

generating an authoritative data set based on data stored in at least one confidence source site;

performing an authority verification on the to-be-verified answer, based on a score of a similarity between the to-be-verified answer and authoritative data in the authoritative data set in at least one dimension;

searching the to-be-verified answer in the authoritative data set, and screening out a set number of target authoritative data satisfying a correlation condition;

calculating, in at least one target dimension, a score of a similarity between the to-be-verified answer and each piece of the target authoritative data respectively, the target dimension refers to a keyword dimension, a sentence dimension or a semantic dimension;

calculating an authority score of the to-be-verified, answer according to a formula:

$$\frac{\sum_{i=0}^{N} \alpha * \text{Word}(Ans, P_i) + \beta * \text{Sent}(Ans, P_i) + \gamma * \text{Sim}(Ans, P_i)}{N};$$

wherein N is the number of target authoritative data satisfying the correlation condition and screened out from the authoritative data set; Word(Ans,$P_i$) is a score of a similarity between the to-be-verified answer Ans and an $i^{th}$ target authoritative data $P_i$ in the keyword dimension, Sent(Ans,$P_i$) is a score of a similarity between Ans and $P_i$ in the sentence dimension, Sim (Ans,$P_i$) is a score of a similarity between Ans and $P_i$ in the semantic dimension, and α, β and γ are preset ratio factors; and in response to the authority score being less than a set authority threshold, filtering and removing the to-be-verified answer from the community question answer data set.

7. The apparatus according to claim 6, wherein calculating, in the keyword dimension, a score of a similarity between the to-be-verified answer and each piece of the target authoritative data, comprises:

acquiring a first keyword set comprised in the to-be-verified answer and a second keyword set comprised in the each piece of the target authoritative data respectively;

acquiring a number of keywords in the first keyword set hitting the second keyword sets; and calculating, in the keyword dimension, the score of the similarity between the to-be-verified answer and the each piece of the target authoritative data based on the number of the keywords and a total number of keywords comprised in the second keyword sets.

8. The apparatus according to claim 6, wherein calculating, in the sentence dimension, a score of a similarity between the to-be-verified answer and each piece of the target authoritative data, comprises:

verifying whether the to-be-verified answer hits a sentence comprised in the each piece of the target authoritative data respectively; and calculating, based on a hit result, the score of the similarity between the to-be-verified answer and the each piece of the target authoritative data in the sentence dimension.

9. The apparatus according to claim 6, wherein calculating; in the semantic dimension, a score of a similarity between the to-be-verified answer and each piece of the target authoritative data, comprises:

combining the to-be-verified answer and the each piece of the target authoritative data into input data respectively;

inputting each piece of the input data into a pre-trained semantic similarity recognition model; and acquiring an output result by the semantic similarity recognition model for the each piece of the input data as the score of the similarity between the to-be-verified answer and the each piece of the target authoritative data in the semantic dimension.

10. The apparatus according to claim 6, wherein the generating an authoritative data set based on data stored in at least one confidence source site, comprises:

selecting at least one confidence source site, acquiring site data of each confidence source site for data cleaning and structured analysis, to generate the authoritative data set.

11. A non-transitory computer readable storage medium, storing a computer program thereon, the program, when executed by a processor, causes the processor to perform operations, the operations comprising:

acquiring a community question answer data set, and generating a plurality of question answer pairs based on the community question answer data set, a question answer pair comprising: a question, and a to-be-verified answer corresponding to the question;

generating an authoritative data set based on data stored in at least one confidence source site;

performing an authority verification on the to-be-verified answer, based on a score of a similarity between the to-be-verified answer and authoritative data in the authoritative data set in at least one dimension;

searching the to-be-verified answer in the authoritative data set, and screening out a set number of target authoritative data satisfying a correlation condition;

calculating, in at least one target dimension, a score of a similarity between the to-be-verified answer and each piece of the target authoritative data respectively, the target dimension refers to a keyword dimension, a sentence dimension or a semantic dimension;

calculating an authority score of the to-be-verified answer according to a formula:

$$\frac{\sum_{i=0}^{N} \alpha * \text{Word}(Ans, P_i) + \beta * \text{Sent}(Ans, P_i) + \gamma * Sim(Ans, P_i)}{N};$$

wherein N is the number of target authoritative data satisfying the correlation condition and screened out from the authoritative data set; Word($Ans,P_i$) is a score of a similarity between the to-be-verified answer Ans and an $i^{th}$ target authoritative data $P_i$ in the keyword dimension, Sent($Ans,P_i$) is a score of a similarity between Ans and $P_i$ in the sentence dimension, Sim($Ans,P_i$) is a score of a similarity between Ans and $P_i$ in the semantic dimension, and $\alpha$, $\beta$ and $\gamma$ are preset ratio factors; and in response to the authority score being less than a set authority threshold, filtering and removing the to-be-verified answer from the community question answer data set.

12. The storage medium according to claim 11, wherein calculating, in the keyword dimension, a score of a similarity between the to-be-verified answer and each piece of the target authoritative data, comprises:

acquiring a first keyword set comprised in the to-be-verified answer and a second keyword set comprised in the each piece of the target authoritative data respectively;

acquiring a number of keywords in the first keyword set hitting the second keyword sets; and calculating, in the keyword dimension, the score of the similarity between the to-be-verified answer and the each piece of the target authoritative data based on the number of the keywords and a total number of keywords comprised in the second keyword sets.

* * * * *

UNITED STATES PATENT AND TRADEMARK OFFICE
CERTIFICATE OF CORRECTION

PATENT NO. : 11,372,942 B2
APPLICATION NO. : 16/691017
DATED : June 28, 2022
INVENTOR(S) : Yu et al.

Page 1 of 1

It is certified that error appears in the above-identified patent and that said Letters Patent is hereby corrected as shown below:

In the Specification

In Column 12 at Line 18, Change "(i.g.," to --(e.g.,--.

In Column 12 at Line 21, Change "(i.g.," to --(e.g.,--.

In the Claims

In Column 16 at Line 13, In Claim 6, change "to-be-verified," to --to-be-verified--.

In Column 16 at Lines 62-63, In Claim 9, change "calculating;" to --calculating,--.

Signed and Sealed this
Twenty-seventh Day of September, 2022

Katherine Kelly Vidal
*Director of the United States Patent and Trademark Office*